Nov. 23, 1971  D. C. NICHOLS ET AL  3,621,669
AIR CONDITIONER CONTROL
Filed Nov. 5, 1969  2 Sheets-Sheet 1
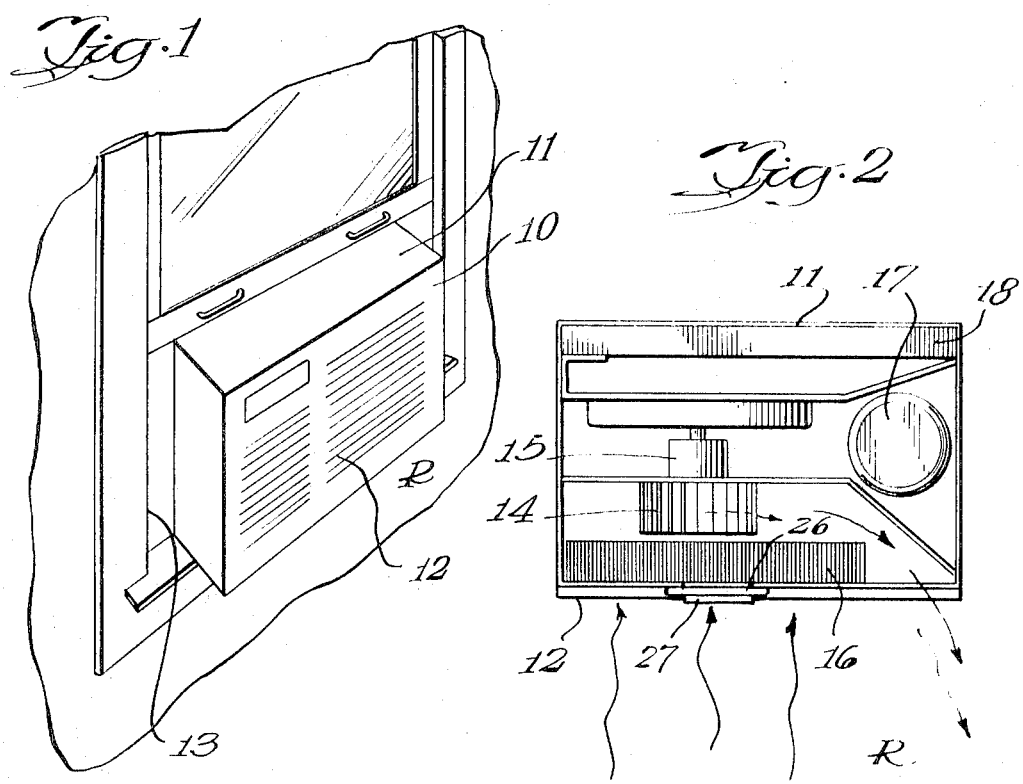
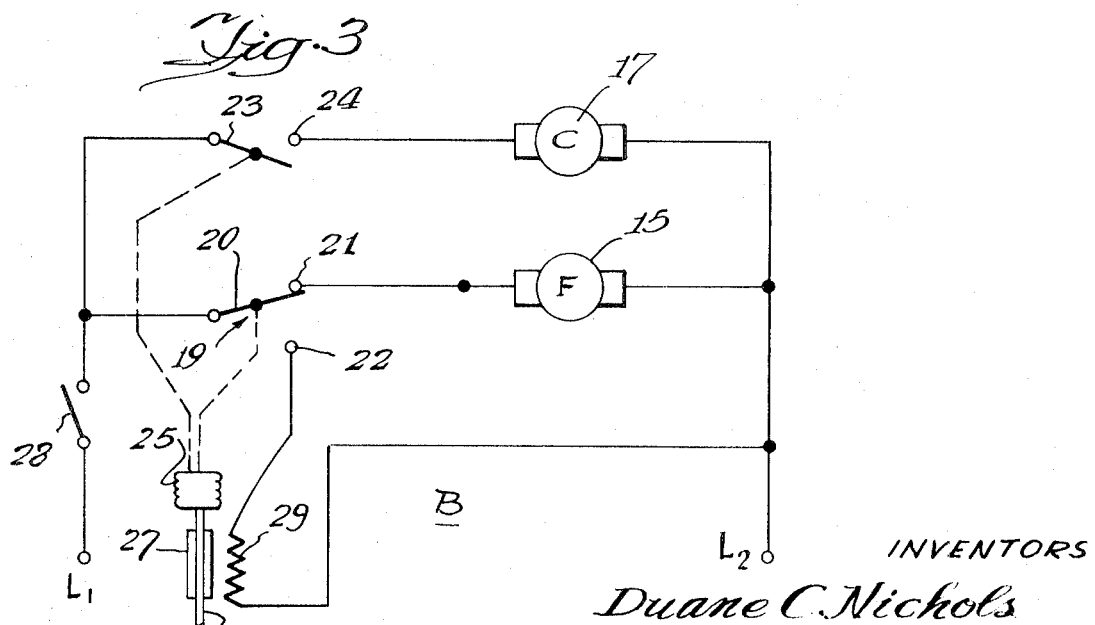
INVENTORS
Duane C. Nichols
Edwin M. Marks
BY Hofgren, Wegner, Allen, Stellman & McCord
ATTORNEYS

United States Patent Office 3,621,669
Patented Nov. 23, 1971

3,621,669
AIR CONDITIONER CONTROL
Duane C. Nichols and Edwin M. Marks, Evansville, Ind., assignors to Whirlpool Corporation
Filed Nov. 3, 1969, Ser. No. 873,448
Int. Cl. F25d *17/00*
U.S. Cl. 62—157                                    9 Claims

ABSTRACT OF THE DISCLOSURE

A control for use in an air conditioner or the like wherein means are provided for intermittently energizing the air circulating fan so as to cause the temperature of the air sensed by the control thermostat to correspond more directly to the temperature of the room air. For this purpose a low wattage heater is associated with the thermostat to heat the thermostat or heat the air adjacent the thermostat when the fan is de-energized and thereby cause the temperature sensed by the thermostat to reach a level sufficient to effect the intermittent operation of the fan.

BACKGROUND OF THE INVENTION

Field of the invention

This invention relates to control circuits and in particular to a control circuit for use in air conditioners.

Description of the prior art

In one form of air conditioner a thermostat is provided for controlling the operation of the air circulating fan. When the temperature of the air being circulated by the air conditioner drops to a preselected low level, operation of the fan is terminated. Re-energization of the fan is controlled by the thermostat which is conventionally mounted within the housing of the air conditioner. The temperature sensing portion of the thermostat is disposed in the air flow path so that as long as the fan is circulating air from and to the room, the temperature sensed by the thermostat corresponds closely to the room air temperature. However it has been found that when the fan operation is stopped, the temperature within the housing adjacent the temperature sensing portion of the thermostat does not rise at all times in direct correspondence to the rise in the room air temperature. This is due to the fact that the air adjacent the sensing portion is static and shielded somewhat by the grill structure of the air conditioner housing. Further, the adjacency of the sensing portion to the conditioner evaporator may further tend to maintain the temperature sensed by the thermostat depressed. Thus, it has been found that in such air conditioners the operation of the fan is not always restarted when the room air temperature reaches the set temperature. The resultant overshoot of the room air temperature is highly undesirable.

SUMMARY OF THE INVENTION

The present invention comprehends an improved air conditioner control arranged to cause the temperature of the air sensed by the thermostat thereof to correspond more directly with the room air temperature to prevent such overshoot. More specifically, the invention comprehends providing means for causing intermittent operation of the fan when the temperature sensed by the fan thermostat is below the temperature at which the thermostat causes continuous operation of the fan thereby to bring room air into adjacency with the thermostat and thereby correlate the temperature sensed by the thermostat with the room air temperature. The means for effecting the intermittent operation of the fan herein comprises means providing heat at the thermostat for heating the thermostat and/or the air adjacent the thermostat to effect actuation of the thermostat to initiate the fan operation. The air resultingly circulated by the fan passes in heat transfer association with the thermostat and the temperature then sensed by the thermostat is effectively that of the room air thereby providing a direct correlation of the sensed temperature with the room air temperature.

BRIEF DESCRIPTION OF THE DRAWINGS

Other features and advantages of the invention will be apparent from the following description taken in connection with the accompanying drawings wherein:

FIG. 1 is a perspective view of an air conditioner embodying the invention mounted in a portion of the room wall;

FIG. 2 is a schematic horizontal section of the air conditioner;

FIG. 3 is a schematic wiring diagram of a portion of the control circuitry thereof;

DESCRIPTION OF THE PREFERRED EMBODIMENT

Figure 4:
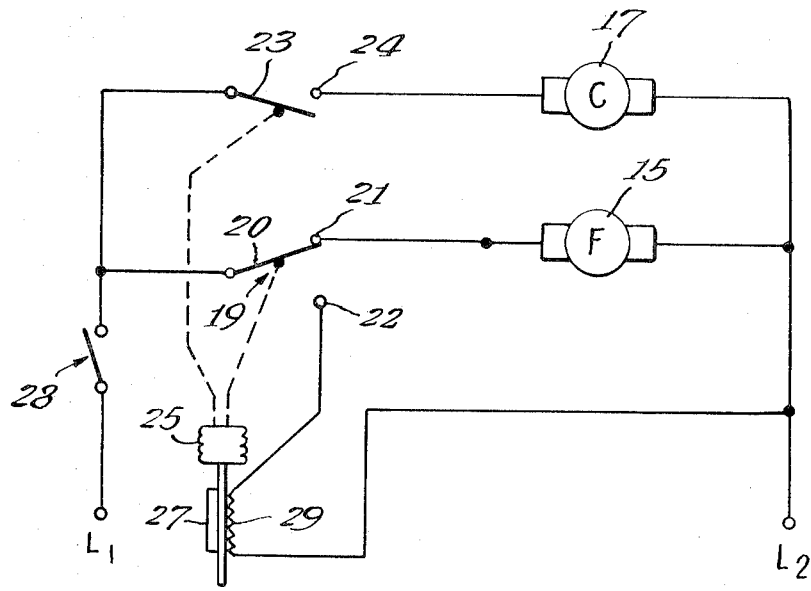
FIG. 4 is a schematic wiring diagram showing a second embodiment of the invention.

In the exemplary embodiment of the invention as shown in the drawing, an air conditioner generally designated 10 is shown to comprise an air cooling unit having an outer housing 11 provided with a front grill 12. Illustratively the air conditioner may be arranged to be mounted in a conventional window opening 13 for conditioning air in a room space R. As shown in FIG. 2, the air conditioner may include a conventional air moving means in the form of a blower, or fan, 14 driven by a suitable electric motor 15 to circulate air inwardly through grill 12 into heat transfer association with an evaporator 16 and deliver the cooled air outwardly through the grill 12 back to the room space R. The air conditioner may be provided with a conventional motor compressor 17 and a condenser 18 also disposed within the housing 11.

As indicated briefly above, the invention comprehends providing an improved control of the operation of electric motor 15 so as to correlate directly the temperature of the room air with the temperature sensed by a thermostat generally designated 19 and having a sensing bulb 26 mounted in the air flow path illustratively behind grill 12 in front of evaporator 16 as seen in FIG. 2. Thermostat 19 includes a single pole double throw switch having its moving contact 20 selectively engageable with a first fixed contact 21 and a second fixed contact 22. The thermostat also includes a single pole single throw switch having a moving contact 23 selectively engageable with a fixed contact 24 for energizing compressor motor 17. The switches are actuated by a bellows 25 having its sensing bulb 26 mounted in front of evaporator 16 by a suitable mounting means 27 as shown in FIG. 2.

As shown in FIG. 3, the fan motor 15 is energized from power supply lead L2 through thermostat fixed contact 21, thermostat moving contact 20 and a single pole single throw On-Off switch 28 to the opposite power supply lead L1. Thermostat 19 is arranged to have moving contact 20 move out of engagement with fixed contact 22 and into engagement with fixed contact 21 when the temperature rises to a first preselected temperature. The moving contact remains in engagement with fixed contact 21 until the temperature sensed by the thermostat drops to a lower second preselected temperature whereupon the moving contact swings into engagement with fixed contact 22 thereby breaking the circuit to fan motor 15 and establishing a circuit from fixed contact 22 through a heater 29 provided for heating the sensing bulb 26.

Heater 25 may be integrally associated with mounting means 27 as shown in FIG. 4 so that heat transfer to the sensing bulb may be effected through the mounting means, or may be disposed adjacent the mounting means as shown in FIG. 3 so as to heat the air immediately adjacent the sensing bulb, and thereby effect a throwing of the switch contact 20 back to fixed contact 21 to re-start fan motor 15. If the room air resultingly circulated by the fan is still below the first preselected temperature, the sensing bulb will be cooled and the moving contact 20 will swing back into engagement with fixed contact 22 re-energizing heater 29. This cycle of operation of the thermostat 19 is continued until the temperature of the air delivered by fan 14 past the sensing bulb 26 is above the first preselected temperature so as to maintain the moving contact 20 in engagement with fixed contact 21 thereby sustaining continuous operation of the fan motor 15. Illustratively, the thermostat 19 may control the operation of compressor 17 and fan 15 such as to maintain the room air temperature at 70° F. by effecting a closure of switch contact 23 at 72° and an opening of the switch contact at 68° with a corresponding closing of switch contact 20 at 70° and an opening thereof at 66° where the thermostat comprises a conventional 4° differential thermostat. As is conventional, the thermostat may comprise an adjustable thermostat to permit the user to set the operating temperatures as desired for maintaining different room air temperatures.

Figure 5:
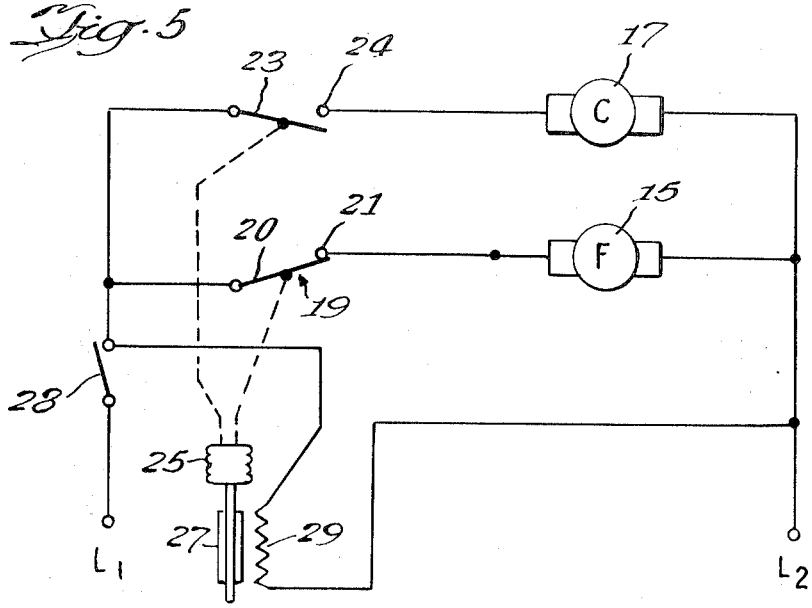
FIG. 5 is a schematic wiring diagram showing a third embodiment of the invention.

Overall operation of the air conditioner may be controlled by the On-Off switch 28. The heater 29 is preferably a low wattage heater so that, if desired, the heater 29 may be continuously energized as shown in FIG. 5 whenever switch 28 is closed to effect operation of the air conditioner. Thus, while some heat is delivered by heater 29 to the sensing bulb 26 during the cooling operation of the air conditioner, the rate of the heat delivered is sufficiently low so that the operation of the thermostat is substantially normal in controlling the on-and-off operation of the air conditioner. In this arrangement the heater is connected directly to switch 28 as shown in FIG. 5.

The foregoing disclosure of specific embodiments is illustrative of the broad inventive concepts comprehended by the invention.

The embodiment of the invention in which an exclusive property or privilege is claimed is defined as follows:

1. In an air conditioner having a housing, cooling means in said housing, and a fan driven by an electric motor for circulating room air through said housing in heat transfer association with said cooling means for cooling said air therein, means for controlling the operation of the fan motor comprising: temperature responsive means including a temperature sensing portion responsive to the temperature of air adjacent thereto for energizing said fan motor when the temperature sensed by said temperature responsive means rises to a preselected temperature; and means for sampling the air to be conditioned comprising means for causing operation of the fan motor periodically including means for providing heat at said temperature sensing portion to raise at periodic intervals the temperature sensed by said temperature responsive means to above said preselected temperature for causing periodic energization of said fan motor.

2. The air conditioner means of claim 1 wherein said heating means comprises an electric heater.

3. The air conditioner means of claim 1 wherein said heating means is caused to be energized continuously.

4. The air conditioner means of claim 1 wherein said temperature responsive means comprises switch means and said heating means comprises an electric heater, said switch means being arranged to energize said heater when said fan motor is de-energized.

5. The air conditioner means of claim 4 wherein said switch means comprises a single pole double throw switch arranged to de-energize said heater whenever said fan is energized.

6. The air conditioner means of claim 1 wherein mounting means are provided for mounting said temperature sensing portion and said heater is mounted integrally with said mounting means.

7. The air conditioner means of claim 1 including switch means for selectively operating the air conditioner, and said heating means is arranged to be energized whenever said switch means is arranged to energize said air conditioner.

8. The air conditioner means of claim 1 wherein the heat providing means is arranged to heat the air adjacent the temperature responsive means.

9. The air conditioner means of claim 1 wherein the heat providing means is arranged to directly heat the sensing portion of said temperature responsive means.

References Cited

UNITED STATES PATENTS

| | | | |
|---|---|---|---|
| 2,988,896 | 6/1961 | Swart | 62—202 |
| 3,118,287 | 1/1964 | Macey | 62—202 |
| 3,174,297 | 3/1965 | Kuhn | 62—202 |

MEYER PERLIN, Primary Examiner

U.S. Cl. X.R.

62—180, 202; 236—68